(12) United States Patent
Holby

(10) Patent No.: US 10,076,085 B2
(45) Date of Patent: Sep. 18, 2018

(54) STACKABLE POTS FOR PLANTS

(71) Applicant: Plantlogic LLC, Smyrna, GA (US)

(72) Inventor: Israel Holby, Sharpsburg, GA (US)

(73) Assignee: Plantlogic LLC, Smyrna, GA (US)

( * ) Notice: Subject to any disclaimer, the term of this patent is extended or adjusted under 35 U.S.C. 154(b) by 170 days.

(21) Appl. No.: 14/885,823

(22) Filed: Oct. 16, 2015

(65) Prior Publication Data

US 2016/0212944 A1    Jul. 28, 2016

(30) Foreign Application Priority Data

| Jan. 26, 2015 | (CN) | 2015 2 0052400 |
| Jan. 26, 2015 | (CN) | 2015 2 0052404 |
| Jan. 26, 2015 | (CN) | 2015 3 0022821 |
| Jan. 26, 2015 | (CN) | 2015 3 0022909 |
| Jun. 2, 2015 | (MX) | 2015 0295 U |
| Jun. 2, 2015 | (MX) | 2015 0296 U |

(51) Int. Cl.
*A01G 9/02*    (2018.01)

(52) U.S. Cl.
CPC .................. *A01G 9/021* (2013.01)

(58) Field of Classification Search
CPC .................. A01G 9/02; A01G 9/021
USPC .................. 47/65.5, 75, 86, 87
See application file for complete search history.

(56) References Cited

U.S. PATENT DOCUMENTS

| 195,094 A | 9/1877 | Crowther |
| D44,563 S | 8/1913 | Haase |
| 1,420,191 A | 6/1922 | Hassig |
| D76,606 S | 6/1928 | Buchwalter |
| 1,710,878 A | 4/1929 | Kelso |
| 1,775,831 A | 9/1930 | Salisbury |
| 1,952,597 A | 3/1934 | Lizzola |
| 1,959,800 A | 5/1934 | Rogge |
| D118,230 S | 10/1939 | Fader |
| D150,258 S | 7/1948 | Rosenberg |
| 2,814,427 A | 11/1957 | Emery |
| 2,834,153 A | 5/1958 | Fearn |
| 2,854,790 A * | 10/1958 | Hartung ................ A01G 9/021 206/520 |

(Continued)

FOREIGN PATENT DOCUMENTS

| AU | 103248 S | 3/1988 |
| AU | 121230 S | 8/1994 |

(Continued)

OTHER PUBLICATIONS

English-language translation of FR 2979797.*

(Continued)

*Primary Examiner* — Lisa L Tsang

(57) ABSTRACT

A pot for a plant may include a container having an axis that is vertical, a base, a sidewall extending upward from the base, an interior, an exterior, drain holes extending from the interior to the exterior and an interior bottom. The container may be configured to receive and be stacked with a second container inside of the container. In one example, the legs of the second container may be configured to extend through the drain holes of the container beyond the interior bottom of the container. In another example, the legs of the second container may be visible from the exterior of the first container.

12 Claims, 11 Drawing Sheets

(56) References Cited

U.S. PATENT DOCUMENTS

| | | |
|---|---|---|
| 3,006,496 A | 10/1961 | Weiman |
| 3,027,684 A | 4/1962 | Keiding |
| 3,381,410 A | 5/1968 | Potain |
| D218,405 S | 8/1970 | Wilson |
| D219,721 S | 1/1971 | Banel |
| 3,800,469 A | 4/1974 | Lau, Jr. et al. |
| D233,058 S | 10/1974 | Bufton |
| 3,896,587 A * | 7/1975 | Insalaco ............ A01G 9/021 47/65.5 |
| 3,916,565 A | 11/1975 | Ruynon |
| 3,975,860 A | 8/1976 | Harned et al. |
| D243,112 S | 1/1977 | Gross |
| 4,015,366 A | 4/1977 | Hall, III |
| 4,023,305 A | 5/1977 | Harschel |
| D245,241 S | 8/1977 | Robinson |
| 4,057,931 A | 11/1977 | Stutelberg |
| 4,173,097 A | 11/1979 | Staby |
| 4,232,482 A | 11/1980 | Watt et al. |
| 4,332,105 A | 6/1982 | Nir |
| RE31,023 E | 9/1982 | Hall, III |
| D268,256 S | 3/1983 | Peterson |
| 4,434,577 A | 3/1984 | Holtkamp |
| 4,528,774 A | 7/1985 | Skaife |
| 4,715,144 A | 12/1987 | Lee |
| D310,186 S | 8/1990 | Lee et al. |
| 5,010,687 A | 4/1991 | Hougard |
| 5,040,330 A * | 8/1991 | Belgiorno ............ A01G 9/10 47/65.6 |
| 5,099,609 A | 3/1992 | Yamauchi |
| 5,172,516 A | 12/1992 | Maillefer |
| D340,204 S | 10/1993 | Grosfillex |
| 5,299,384 A | 4/1994 | Andrews |
| 5,327,679 A * | 7/1994 | Hawthorne ............ A01G 9/10 47/65.5 |
| D360,166 S | 7/1995 | Grosfillex |
| 5,446,995 A | 9/1995 | Huber |
| 5,448,854 A | 9/1995 | Hirsch et al. |
| 5,459,960 A | 10/1995 | Manlove |
| D383,707 S | 9/1997 | Waszkiewicz, III |
| D392,914 S | 3/1998 | Friend |
| D394,827 S | 6/1998 | Ruthenberg |
| 5,761,848 A * | 6/1998 | Manlove ............ A01G 9/10 47/65.5 |
| 5,782,035 A | 7/1998 | Locke et al. |
| D405,386 S | 2/1999 | Ross |
| 5,918,415 A | 7/1999 | Locke et al. |
| 5,921,025 A | 7/1999 | Smith |
| 6,047,499 A | 4/2000 | Staas |
| D424,472 S | 5/2000 | Grosfillex |
| 6,070,360 A | 6/2000 | Liao et al. |
| 6,085,460 A * | 7/2000 | Jackson ............ A01G 9/028 47/65.5 |
| 6,134,832 A † | 10/2000 | Bokmiller |
| 6,289,632 B1 | 9/2001 | Baling |
| D450,011 S | 11/2001 | Fan |
| 6,339,899 B1 * | 1/2002 | Lehmann ............ A01G 9/10 47/65.5 |
| D458,560 S | 6/2002 | D'Hulst |
| 6,439,529 B1 † | 8/2002 | Wong |
| D468,662 S | 1/2003 | Fan |
| D468,663 S | 1/2003 | Fan |
| D475,854 S | 6/2003 | Caponey |
| D480,326 S | 10/2003 | Carlson |
| D485,510 S | 1/2004 | Fan |
| D488,401 S | 4/2004 | Gutierrez |
| 6,729,070 B1 | 5/2004 | Locke et al. |
| D505,882 S | 6/2005 | Hensen |
| 7,080,484 B2 | 7/2006 | Littge |
| 7,093,391 B2 | 8/2006 | Eakin |
| D528,940 S | 9/2006 | Espejo |
| D574,118 S | 7/2008 | Gusdorf |
| 7,610,717 B2 | 11/2009 | Luken et al. |
| 7,624,535 B2 * | 12/2009 | Schmidt ............ A01G 9/021 206/423 |
| 7,673,417 B2 | 3/2010 | Smith et al. |
| 7,676,987 B2 | 3/2010 | Yoshida et al. |
| 7,690,150 B2 | 4/2010 | Orschulik |
| 7,730,666 B2 | 6/2010 | Spray |
| 7,877,930 B2 | 2/2011 | Burge et al. |
| D634,669 S | 3/2011 | Brandstätter |
| 7,958,671 B2 | 6/2011 | Sheaffer et al. |
| D650,614 S | 12/2011 | Martin et al. |
| D650,719 S | 12/2011 | Gretz |
| D660,196 S | 5/2012 | Huang et al. |
| D665,300 S | 8/2012 | Pedersen et al. |
| 8,312,674 B2 | 11/2012 | Adams |
| 8,434,261 B2 * | 5/2013 | Nobbe ............ A01G 9/021 47/65.7 |
| 8,510,988 B2 | 8/2013 | Anderson et al. |
| D700,839 S | 3/2014 | O'Brien et al. |
| 2003/0106262 A1 * | 6/2003 | Lai ............ A01G 9/02 47/65.6 |
| 2005/0086863 A1 | 4/2005 | Brutsche, III et al. |
| 2005/0132646 A1 | 6/2005 | Littge |
| 2005/0217177 A1 | 10/2005 | Littge |
| 2006/0123704 A1 | 6/2006 | Yoshida et al. |
| 2006/0277825 A1 | 12/2006 | Sanders |
| 2009/0249687 A1 | 10/2009 | Burge |
| 2011/0036003 A1 * | 2/2011 | Schmidt ............ A01G 9/021 47/65.7 |
| 2011/0258928 A1 † | 10/2011 | Adams |

FOREIGN PATENT DOCUMENTS

| | | | |
|---|---|---|---|
| AU | 121231 S | 8/1994 | |
| AU | 122514 S | 2/1995 | |
| AU | 124629 S | 9/1995 | |
| AU | 124631 S | 9/1995 | |
| AU | 713138 B2 | 11/1999 | |
| AU | 152256 S | 7/2003 | |
| AU | 154653 S | 2/2004 | |
| AU | 2006101024 B4 | 1/2007 | |
| AU | 321131 S | 9/2008 | |
| AU | 2008203801 A1 | 3/2009 | |
| BE | 055707 | 1/2006 | |
| CA | 2257539 A1 | 12/1996 | |
| CA | 2158720 C | 3/2001 | |
| CH | 052056 | 2/2000 | |
| CH | 054144 | 8/2000 | |
| CH | 064167 | 7/2003 | |
| CH | 052056 | 2/2005 | |
| CH | 054144 | 8/2005 | |
| CH | 064167 | 7/2008 | |
| CH | 072963 | 1/2010 | |
| CN | 201286258 Y | 8/2009 | |
| CN | 204540084 U | 8/2015 | |
| DE | 054987 | 2/2006 | |
| DE | 074863 | 11/2010 | |
| DE | 079361 | 9/2012 | |
| EP | 105075 | 4/1984 | |
| EP | 1037521 | 9/2000 | |
| EP | 2585744 | 1/2005 | |
| EP | 1527676 | 5/2005 | |
| EP | 1600054 A2 | 11/2005 | |
| EP | 1006775 A2 | 6/2006 | |
| EP | 1894466 A2 * | 3/2008 | ............ A01G 9/021 |
| ES | I0090997 | 1/1978 | |
| ES | I0091091 | 1/1978 | |
| ES | I0118322 | 5/1989 | |
| ES | I0140080 | 1/1997 | |
| ES | I0153331 | 11/2002 | |
| ES | I0154344 | 2/2003 | |
| ES | D0507799-01 | 10/2009 | |
| ES | D0514633-01 | 4/2012 | |
| ES | D0516693-02 | 4/2013 | |
| FR | 057487 | 10/2001 | |
| FR | 063766 | 7/2002 | |
| FR | 062286 | 12/2002 | |
| FR | 064593 | 11/2003 | |
| FR | 064237 | 8/2008 | |
| FR | 064593 | 11/2008 | |
| FR | 2979797 A1 * | 3/2013 | ............ A01G 9/021 |
| FR | 072660 | 11/2014 | |

(56) References Cited

FOREIGN PATENT DOCUMENTS

| | | |
|---|---|---|
| GB | 103027 | 1/1917 |
| GB | 1012759 | 2/1984 |
| GB | 2161358 | 1/1986 |
| GB | 2161358 A | 1/1986 |
| GB | 1046497 | 5/1988 |
| GB | 1049399 | 9/1988 |
| GB | 1049400 | 9/1988 |
| GB | 1058154 | 10/1989 |
| GB | 1058289 | 10/1989 |
| GB | 2006920 | 9/1990 |
| GB | 2017498 | 9/1991 |
| GB | 2017499 | 9/1991 |
| GB | 2023384 | 6/1992 |
| GB | 2035299 | 3/1994 |
| GB | 2038285 | 4/1994 |
| GB | 2052509 | 9/1994 |
| GB | 2041654 | 1/1995 |
| GB | 2045013 | 6/1995 |
| GB | 2047048 | 8/1995 |
| GB | 2050488 | 9/1995 |
| GB | 2052966 | 12/1995 |
| GB | 2062867 | 8/1996 |
| GB | 2063506 | 2/1997 |
| GB | 2076970 | 2/1998 |
| GB | 2090047 | 2/2000 |
| GB | 3002583 | 3/2002 |
| GB | 3020661 | 3/2003 |
| GB | 3021930 | 7/2005 |
| GB | 4002930 | 5/2007 |
| GB | 4022275 | 11/2011 |
| GB | 4022276 | 11/2011 |
| GB | 4024314 | 5/2012 |
| GR | 050523 | 11/1999 |
| IT | 060130 | 7/2001 |
| JP | 2000083498 A | 3/2000 |
| JP | 2003079250 A | 3/2003 |
| JP | 2004154118 A | 6/2004 |
| JP | 4131820 B2 | 8/2004 |
| JP | 2004222552 A | 8/2004 |
| JP | 04003103 B2 | 11/2007 |
| JP | 2001314126 A | 11/2011 |
| KR | 10-2008-0084088 A | 9/2008 |
| KR | 10-2009-0119097 A | 11/2009 |
| KR | 10-0982629 B1 | 9/2010 |
| KR | 10-2010-0130678 A | 12/2010 |
| KR | 1229172 B1 | 2/2013 |
| MX | I0139194 | 4/1977 |
| MX | 720 | 12/1978 |
| MX | 812 | 3/1979 |
| MX | 9391 | 4/1998 |
| MX | 19755 | 12/2005 |
| MX | 30942 B | 3/2009 |
| MX | 28929 B | 8/2009 |
| MX | 29858 B | 11/2009 |
| MX | 29859 B | 11/2009 |
| MX | 29860 B | 11/2009 |
| MX | 30453 B | 2/2010 |
| MX | 30454 B | 2/2010 |
| MX | 31383 B | 6/2010 |
| MX | 33493 B | 4/2011 |
| MX | 35461 B | 9/2011 |
| MX | 34758 B | 10/2011 |
| MX | 35741 B | 2/2012 |
| NL | I0132319 | 5/1994 |
| NL | 052324 | 3/2000 |
| NL | 054914 | 3/2000 |
| RS | 073172 | 2/2010 |
| RS | 081798 | 8/2013 |
| WO | 1990008461 A1 | 8/1990 |
| WO | 1996039801 A1 | 12/1996 |
| WO | 9930553 | 6/1999 |
| WO | 1999035899 A1 | 7/1999 |
| WO | 2005029943 A1 | 4/2005 |
| WO | 2009109761 A1 | 9/2011 |
| WO | 2012001380 A1 | 1/2012 |

OTHER PUBLICATIONS http://bonsaisafibonsai.blogspot.mx/p/seleccion-de-la-maceta.html (retrieved from the Internet 2014).
http://alisiosbonsai.blogspot.mx/2014_05_01_archive.html (retrieved from the Internet 2014).
http://articulo.mercadolibre.com.ar/MLA-527785091-macetas-para-bonsai-ceramica-roja-redondas-y-rectangulares-_JM (retrieved from the Internet 2014).
http://aprender-observando.blogspot.mx/2012/03/reciclar-neumatico-para-hacer-maceta.html (retrieved from the Internet 2014).
http://www.alcaglas.com/infer.php?gr=huerto-urbano-ecologico&sg=recipientes-plantar-huerto (retrieved from the Internet 2014).
http://www.todorquidea.com/es/macetas-barro/218-media-luna-grande.html (retrieved from the Internet 2014).
http://articulo.mercadolibre.com.ar/MLA-527786468-macetas-bonsai-ceramica-esmaltada-redondas-y-rectangulares-_JM (retrieved from the Internet 2014).
http://www.servovendi.com/es/maceta-contenedor-teku-transparente-para-orquideas-mcp-12-z-12cm.html (retrieved from the Internet 2014).
http://www.infojardin.com/foro/showthread.php?t=148237&page=3 (retrieved from the Internet 2014).
http://ceramicasfuisca.blogspot.mx/2012_02_01_archive.html (retrieved from the Internet 2014).
http://alisiosbonsai.blogspot.mx/2012_04_01_archive.html (retrieved from the Internet 2014).
http://aprender-observando.blogspot.mx/2012/05/maceta-y-estructura-patas-hechas-con.html (retrieved from the Internet 2014).
http://co-intelgroup.en.made-in-china.com/product/EbOJlisxlTRQ/China-Biodegradable-Flower-Pots-Seedling-Pots-Corn-Starch-Based.html (retrieved from the Internet 2014).
http://cart100.com/Category/50005527/Flower_flowers?&p=17 (retrieved from the Internet 2014).
https://www.pinterest.com/tlcpooldesign/garden-design-pots-planters/ (retrieved from the Internet 2014).
http://gardening.about.com/od/containergardenin1/gr/UltraGrow.htm (retrieved from the Internet 2014).
Extended European search report with regard to European application No. 16 152 283.4, dated May 9, 2016.
Technical Search, 2015, 2 pgs.
http://minecraft-es.gamepedia.com/Maceta (retrieved from the Internet 2014).
http://minecraft-nl.gamepedia.com/Ketel (retrieved from the Internet 2014).
https://gregthecrazyfishguy.wordpress.com/2013/10/10/vermicomposting/ (retrieved from the Internet 2014).
http://www.pinterest.com/mayagallacher/gardening-plant-containers/ (retrieved from the Internet 2014).
http://firstrays.com/cart/5-inch-square-flower-pot-7-inches-tall (retrieved from the Internet 2014).
http://www.thegardensuperstore.co.uk/acatalog/Plant_Pots_-_Square.html (retrieved from the Internet 2014).
http://www.tindaraorchids.com/orchid_pots.htm (retrieved from the Internet 2014).
http://www.vatgia.com/raovat/1844/10810106/thung-nhua-dac-154-x-86-x-82cm-do-day-4-4-5mm-thung-nhua-chu-nhat-thung-nhua-to.html (retrieved from the Internet 2014).
http://newflowerpots.blogspot.mx/2014/10/modern-flower-pots.html (retrieved from the Internet 2014).
http://homesweetother.com/flower-pot/ (retrieved from the Internet 2014).
http://rejigdesign.com/flower-pots/ (retrieved from the Internet 2014).
http://www.richland-china.com/melamine-flower-pot-2576.html (retrieved from the Internet 2014).
http://freshome.com/2012/10/22/creating-indoor-flower-terraces-with-i-pot-modular-system-by-supercake/ (retrieved from the Internet 2014).
http://www.aliexpress.com/price/cheap-plastic-trays_price.html (retrieved from the Internet 2014).
https://www.etsy.com/es/market/decorative_planter (retrieved from the Internet 2014).

(56) References Cited

OTHER PUBLICATIONS http://www.gopixpic.com/600/pata-de-elefante/http:%7C%7Cwww*floranativa*com%7Cimages%7Cprodutos%7CAluguelPataElefante*gif/ (retrieved from the Internet 2014).
http://jacsanplantasymacetas-jacsan.blogspot.mx/2009_01_01_archive.html (retrieved from the Internet 2014).
http://www.infojardin.com/foro/showthread.php?t=90404 (retrieved from the Internet 2014).
http://www.bato.nl/es/maceta-quadro-12litro (retrieved from the Internet 2014).
http://www.bato.nl/Vierkante-pot-10-liter (retrieved from the Internet 2014).
http://aprender-observando.blogspot.mx/2012_02_01_archive.html (retrieved from the Internet 2014).
http://agriculturers.com/novedosas-macetas-para-cultivos-de-alta-densidad-llegan-latinoamerica/ (retrieved from the Internet 2014).
http://www.pavimentosinfantiles.es/productos/jardineras/jardinera-rectangular-refe80896.asp (retrieved from the Internet 2014).
http://www.twenga.es/maceta-grande.html (retrieved from the Internet 2014).
http://www.growland.it/Vaso-per-fiori-in-terracotta-11-litri-25x25x255-cm (retrieved from the Internet 2014).
http://foro.amigosdelcannabis.cl/viewtopic.php?t=21076 (retrieved from the Internet 2014).
http://newflowerpots.blogspot.mx/2014/10/plastic-flower-pot.html (retrieved from the Internet 2014).
http://www.plasticboxshop.co.uk/home-storage-c1/garden-and-outdoor-plastics-c6/plastic-garden-pots-and-plastic-saucers-c59/7-5cm-3-plastic-terracotta-garden-plant-pots-pack-of-10-p246 (retrieved from the Internet 2014).
http://www.thepotterypatch.com/flower_pots%5Coutdoor_glazed_pots/blended_outdoor_glazed/fishbowl_planter_ch434-438.asp (retrieved from the Internet 2014).
http://rejigdesign.com/clay-flowers-decoration/ (retrieved from the Internet 2014).
https://www.silverfishlongboarding.com/forum/general-longboarding/83448-lordy-lordy-if-youre-40-come-2736.html (retrieved from the Internet 2014).
http://newflowerpots.blogspot.mx/2014/10/plastic-flower-pots-wholesale.html (retrieved from the Internet 2014).
http://www.gardenpotdirect.com/product/double-color-flower-pot-cheap-flower-pot/ (retrieved from the Internet 2014).
http://www.p-wholesale.com/subcat/13/560/flower-pot-planter-p8.html (retrieved from the Internet 2014).
http://www.picswallpaper.com/download/served-up-in-flower-pots-wallpaper/ (retrieved from the Internet 2014).
http://en.wikipedia.org/wiki/Flowerpot (retrieved from the Internet 2014).
http://flowers-kid.com/flower-pot-clipart-png.htm (retrieved from the Internet 2014).
http://www.starlightcanada.org/mothers-day-craft-kids-decorative-flower-pot/ (retrieved from the Internet 2014).
http://www.orchidsplus.com/growing-flowers-in-pots/ (retrieved from the Internet 2014).
https://www.etsy.com/es/listing/206839040/vintage-off-white-pottery-decorative?ref=market (retrieved from the Internet 2014).
https://www.etsy.com/es/listing/208933106/vintage-brass-decorative?ref=market (retrieved from the Internet 2014).
https://www.etsy.com/es/listing/212254237/large-vintage-brass-planter-hammered?ref=market (retrieved from the Internet 2014).
https://www.etsy.com/es/listing/199432439/sugar-bowl-ceramic-pot-condiment-bowl?ref=market (retrieved from the Internet 2014).
https://www.etsy.com/es/listing/206856404/vintage-off-whitebrown-pottery?ref=market (retrieved from the Internet 2014).
http://ideasparadecoracion.com/maceteros-divertidos-para-exhibir-tus-plantas/ (retrieved from the Internet 2014).
http://listado.mercadolibre.com.ar/jardines-y-exteriores-macetas/pata (retrieved from the Internet 2014).
http://jardin.about.com/od/plantasinteriores/a/Palmera-Pata-De-Elefante-Tronco-De-Botella-O-Cola-De-Caballo.htm (retrieved from the Internet 2014).
http://alisiosbonsai.blogspot.mx/2014_06_01_archive.html (retrieved from the Internet 2014).
http://www.bato.nl/en/uni-trough, accessed Oct. 2015.
Photographs of prior art containers, taken on or about Sep. 2015. (4 pages).

* cited by examiner
† cited by third party

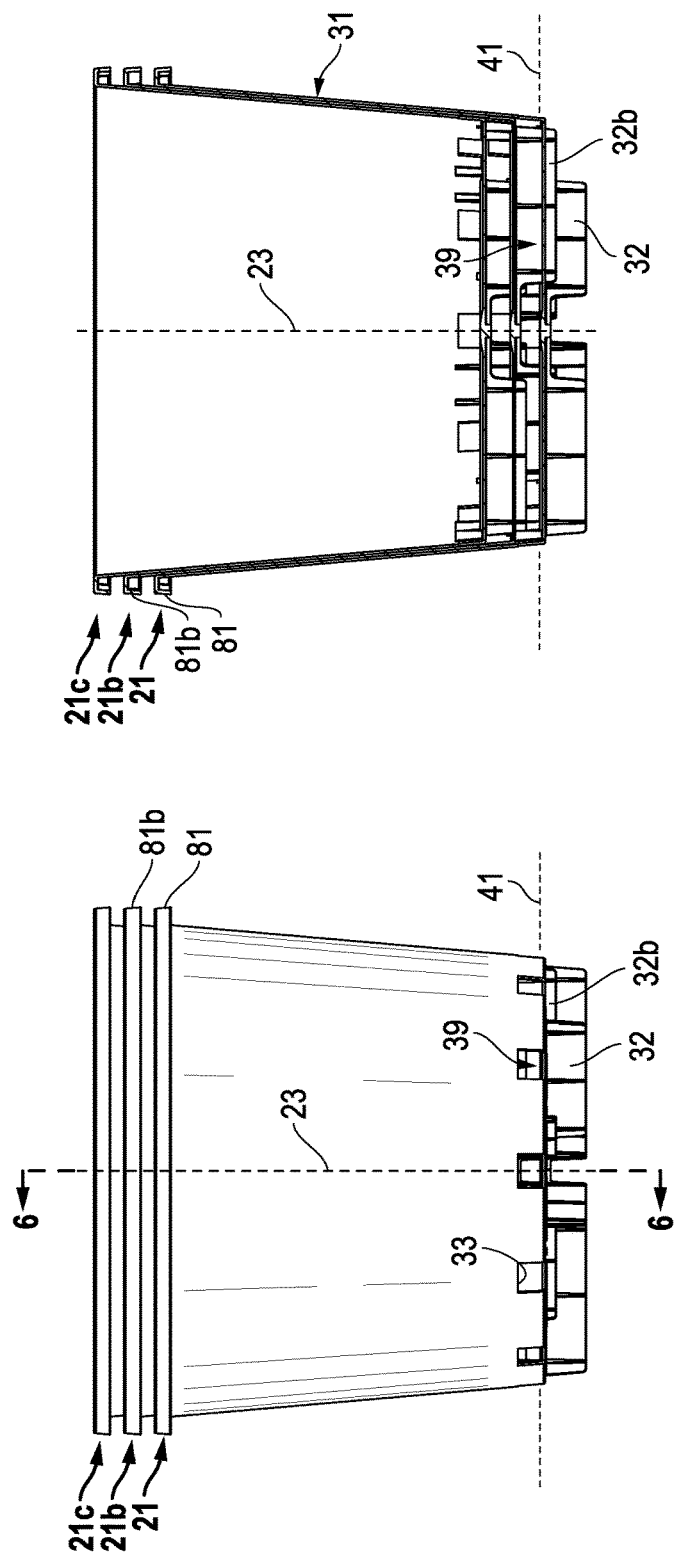

STACKABLE POTS FOR PLANTS

This application claims priority to and the benefit of Chinese Utility Model App. No. 201520052400.7, filed Jan. 26, 2015, and granted on Aug. 5, 2015, as CN Utility Model 204518620 U; Chinese Utility Model App. No. 201520052404.5, filed Jan. 26, 2015, and granted on Aug. 5, 2015, as CN 204518621 U; Chinese Design Patent App. No. 201530022821.0, filed Jan. 26, 2015, and granted on Aug. 5, 2015, as design patent CN 303318173 S; Chinese Design Patent App. No. 201530022909.2, filed Jan. 26, 2015, and granted on Aug. 5, 2015, as design patent CN 303318174 S; Mexican Utility Model App. No. MX-U-2015-000295, filed Jun. 2, 2015, and Mexican Utility Model App. No. MX-U-2015-000296, filed Jun. 2, 2015, all of which are incorporated herein by reference in their entireties.

BACKGROUND OF THE INVENTION

Field of the Disclosure

The present invention relates in general to pots and, in particular, to a system, method and apparatus for stackable pots for plants.

Description of the Related Art

Berry plants, such as blueberry plants, are well suited for growth in a container due to their shallow root system that allows swift adaptation to reduced space. Blueberry roots are fibrous and have a small extension, and since they do not have hairs, the younger roots are the ones responsible for nutrients intake.

Another reason for growing blueberries in containers is that they require a specialized soil with a low and acid pH ranging between 4.5 and 4.8. With in-ground plantings, maintaining this low pH may require a concerted, ongoing effort, whereas by using a container or pot it is possible to create the ideal soil pH at planting time.

One method of growing in containers uses a pot described in U.S. Pat. No. 426,490, which provides a square pot, not showing any particular benefit for blueberries since its flat base is in direct contact with the ground. U.S. Pat. No. 415,065 discloses a pot of square structure with an upper peripheral border and vertical parallel bars equidistantly distributed over its outer sidewalls. This pot does not showcase a drainage system effective enough for blueberry growing. U.S. Pat. No. 466,829 discloses a pot of irregular square body with an independent element capable of being assembled in the base by way of a clamping system. In spite of exhibiting square structures, these pots do not have a base adequately engineered to allow proper packing and transportation. Furthermore, these pots are not favorable for high density blueberry production since they do not display space enough between the base and the ground thus preventing an efficient drainage of liquid waste produced as a consequence of plant growing. Improvements in plant-growing containers continue to be of interest.

SUMMARY

Embodiments of a pot for a plant may include a container having an axis that is vertical, a base, a sidewall extending upward from the base, an interior, an exterior, drain holes extending from the interior to the exterior and an interior bottom. The container may be configured to receive and be stacked with a second container inside of the container. The second container can be substantially identical to the container. In one example, the legs of the second container may be configured to extend through the drain holes of the container beyond the interior bottom of the container. In another example, the legs of the second container may be visible from the exterior of the first container.

In another embodiment, a stack of containers may include a first container having an axis that is vertical, a base, a sidewall extending axially upward from the base, an interior, an exterior, drain holes extending from the interior to the exterior, an interior bottom, a rim at an upper portion and legs at a lower portion. A second container, substantially identical to the first container, may be stacked inside of the first container, such that both the rim and the legs of the second container are visible from the exterior of the first container.

In still another versions, a pot for a plant may include a container that is round and has an axis that is vertical, a base, a sidewall extending upward from the base, an interior, an exterior, at least two different types of drain holes extending from the interior to the exterior, an interior bottom, and legs extending downward from the base. A first type of drain hole may be located adjacent a perimeter of the base in at least one of the sidewall and the base. A second type of drain hole may be located in the base and comprises a plurality of holes configured in a radial array. The legs may include substantially flat fins that are configured in a radial array.

Another embodiment for a pot for a plant may include a container that is rectangular and has an axis that is central and vertical, a base, sidewalls extending upward from the base, an interior, an exterior, at least two different types of drain holes extending from the interior to the exterior, an interior bottom that is not flat, and legs extending downward from the base. A first type of drain hole may be formed in at least one of the sidewall and the base, and located adjacent a perimeter of the base. A second type of drain holes may be located in the base and at a different vertical elevation that the first type of drain holes.

Yet another version of a pot for a plant may include a container having an axis that is vertical, a base, a sidewall extending upward from the base, an interior, an exterior, drain holes extending from the interior to the exterior, an interior bottom, and legs extending downward from the base. The base may be removably coupled to the sidewall such that the base and the sidewall comprise two separate components that are configured to be assembled together.

The foregoing and other objects and advantages of these embodiments will be apparent to those of ordinary skill in the art in view of the following detailed description, taken in conjunction with the appended claims and the accompanying drawings.

BRIEF DESCRIPTION OF THE DRAWINGS

So that the manner in which the features and advantages of the embodiments are attained and can be understood in more detail, a more particular description may be had by reference to the embodiments thereof that are illustrated in the appended drawings. However, the drawings illustrate only some embodiments and therefore are not to be considered limiting in scope as there may be other equally effective embodiments.

FIG. 5 is a side view of three of the pots of FIG. 1 stacked together.

FIG. 6 is a sectional side view of the pots of FIG. 5, taken along the line 6-6.

The use of the same reference symbols in different drawings indicates similar or identical items.

DETAILED DESCRIPTION

Figure 1:
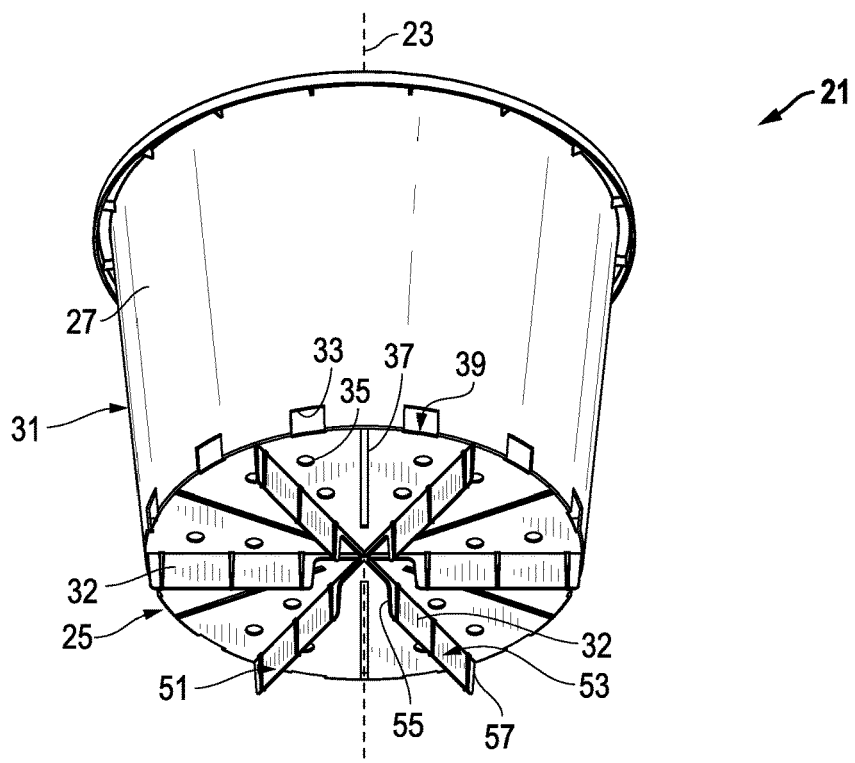
FIG. 1 is a lower isometric view of a first embodiment of a pot.
Figure 2:
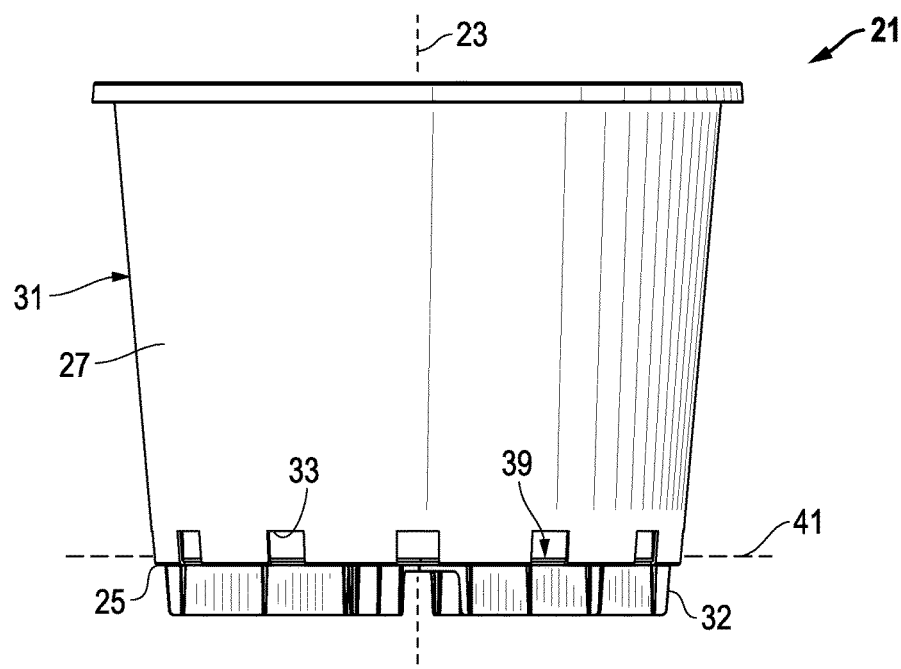
FIG. 2 is a side view of the pot of FIG. 1.
Figure 3:
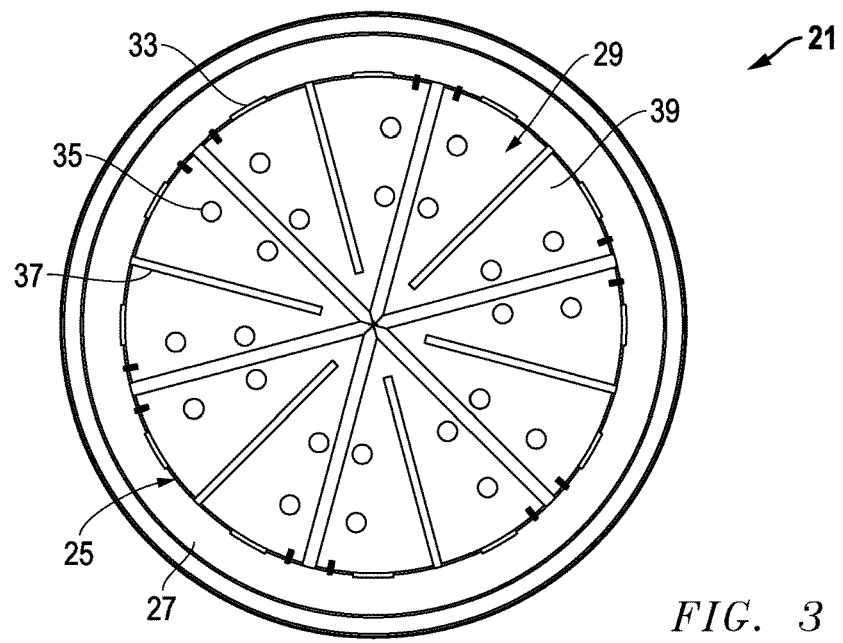
FIG. 3 is a top view of the pot of FIG. 1.

Embodiments of a system, method and apparatus for pots for plants are disclosed. For example, as shown in FIGS. 1-6, an embodiment of a pot for a plant may comprise a container 21 having an axis 23 that is vertical. Embodiments of container 21 may include various sizes and shapes, such as 10 liter round, 25 liter round (e.g., FIGS. 1-6), 10 liter square (e.g., FIGS. 7-13), 25 liter square, etc. Other embodiments may include a profile shape that is cylindrical, frustoconical, polygonal, rectangular, pentagonal, hexagonal or still other shapes.

Versions of the container 21 may include a base 25, a sidewall 27 extending upward from the base 25, an interior 29 (FIG. 3), an exterior 31 and legs 32 extending downward from the base 25. Some versions of the container 21 may be opaque, such as not translucent and not transparent. Embodiments of the container 21 may be configured to be used without a tray to capture or retain fluid in the container 21 during operation, such that the drain holes 33, 35, 37 remain uncovered and unhindered during operation at all times.

In addition, embodiments of the container 21 may include one or more types of drain holes (e.g., three types of drain holes 33, 35, 37 are illustrated). The drain holes 33, 35, 37 may extend from the interior 29 to the exterior 31. Container 21 may include an interior bottom 39. In one version, a plane 41 (FIG. 2) may be defined within the interior 29. For example, the plane 41 may be defined by the interior bottom 39, which can be substantially flat, such that the plane 41 is an axially lowermost plane in the interior 29 and substantially perpendicular to the axis 23.

In other versions, the interior bottom 39 may be slightly conical, with an apex at axis 23, in either a concave or convex configuration when viewed from the exterior 31.

Embodiments of the container 21 may be configured to receive and be stacked with other containers 21, such as containers 21b and 21c in FIGS. 5 and 6, inside each other. The containers 21 may be substantially identical to each other. Versions of the containers 21 may include the legs 32b of a second container 21b being configured to extend through the drain holes 37 of the first container 21 beyond the interior bottom 39 of the first container. For example, the legs 32b of the second container 21b may be visible from the exterior 31 of the first container 21. In some versions, the interior bottom 39 is an axially lowermost portion of the interior 29 of the container 21, such that the legs 32b of the second container 21b may be configured to extend axially below the interior bottom 39. In another example, the legs 32b of the second container 21b may be configured to extend below a lowermost portion of the exterior of the base 25.

In some embodiments, a percentage of an axial length of the legs 32b of the second container 21b are visible from the exterior 31 of the first container 21. For example, the percentage can be at least about 10%, such as at least about 20%, at least about 30%, at least about 40%, at least about 50%, or even at least about 60%. In other versions, the percentage can be not greater than 100%, such as not greater than 80%, or even not greater than 70%. Other embodiments of the percentage can be in a range between any of these values.

In other embodiments of the container 21, when stacked, an axial distance of separation between the container 21 and the second container 21b may be configured to be a selected value. For example, the axial distance can be not greater than about 25 mm, such as not greater than about 20 mm, not greater than about 15 mm, not greater than about 10 mm, or even not greater than about 5 mm. In other versions, the axial distance can be at least about 1 mm, such as at least about 3 mm, at least about 5 mm, or even at least about 10 mm. The axial distance can be in a range between any of these values.

Embodiments of the container 21 may include bottoms of the legs 32b of the second container 21b to be configured to be axially spaced apart by an axial distance from bottoms of the legs 32 of the container 21. For example, the axial distance can be not greater than about 25 mm, such as not greater than about 20 mm, not greater than about 15 mm, not greater than about 10 mm, not greater than about 5 mm. In other versions, the axial distance can be at least about 1 mm, such as at least about 3 mm, at least about 5 mm, or even at least about 10 mm. The axial distance can be in a range between any of these values.

In another embodiment, the container 21 may include an upper portion, such as a top rim 81 (FIGS. 5 and 6) and a lower portion, such as legs 32. The second container 21b may be substantially identical to and stacked inside the container 21. In an example, both the top rim 81b and the legs 32b of the second container 21b are visible from the exterior 31 of the container 21.

As described herein, the drain holes 33, 35, 37 may include at least two different types of drain holes. For example, a first type of drain hole 33 may include substantially rectangular drain holes. The first type of drain hole 33 may be located in at least one of the base 25 and the sidewall 27. Versions of the first type of drain hole 33 may be located adjacent a perimeter of the base 25.

Embodiments of a second type of drain hole 35 may include circular drain holes. In an example, the second type of drain hole 35 may be located in the base 25. The second type of drain hole 35 may include a plurality of holes configured in a radial array, as shown. Versions of the radial array may extend from adjacent the axis 23 to adjacent a perimeter of the base 25.

Versions of a third type of drain hole 37 may include elongated slot drain holes. For example, the third type of drain hole 37 may be located in the base 25. The third type of drain hole 37 may include a plurality of holes configured in a radial array. The radial array may extend from adjacent the axis 23 to adjacent a perimeter of the base 25.

In the illustrated embodiments, the legs 32 may comprise various shapes, such as substantially flat fins. For example, the flat fins may be rectangular. Versions of the legs 32 may be formed in a radial array. In an example, the radial array may extend from adjacent the axis 23 to adjacent a perimeter of the base 25. A version of the legs 32 can be substantially perpendicular to the base 25. In an embodiment, the legs 32 may be substantially perpendicular to a tangent of the sidewall 27.

Figure 4:
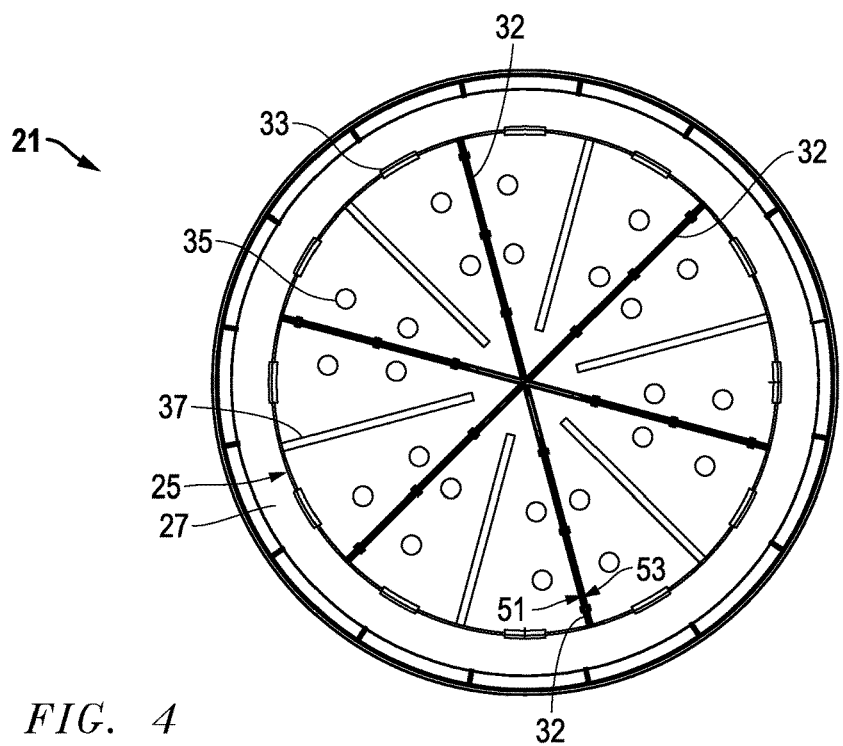
FIG. 4 is a bottom view of the pot of FIG. 1.
Figure 7:
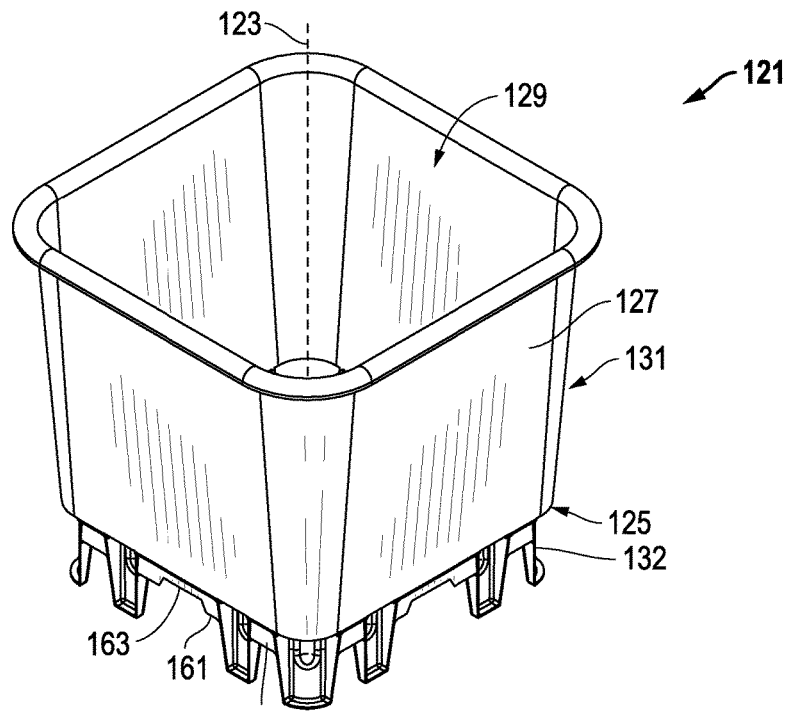
FIG. 7 is an upper isometric view of a second embodiment of a pot.
Figure 8:
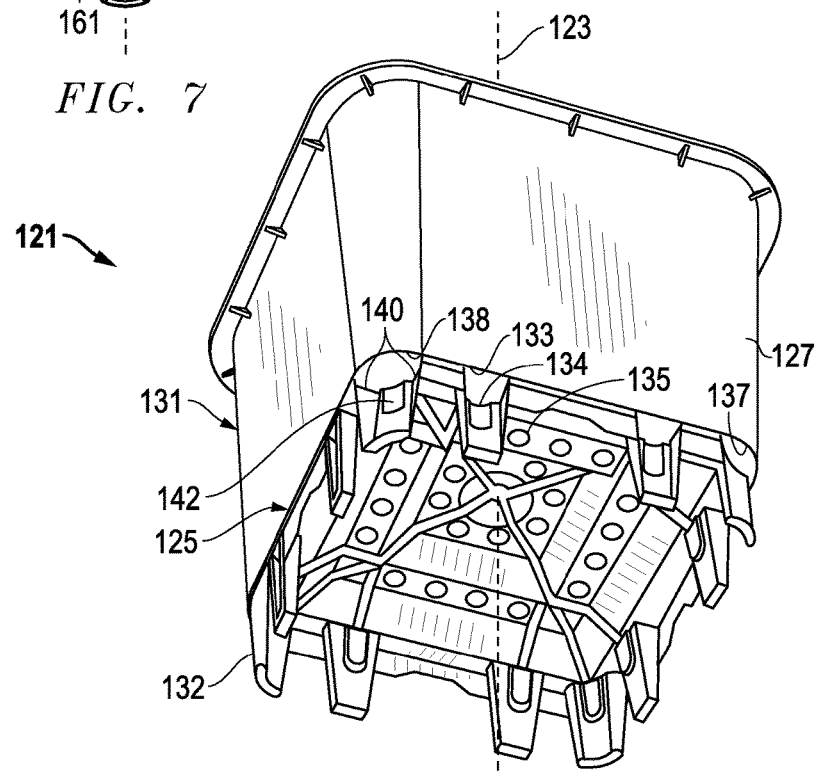
FIG. 8 is a lower isometric view of the pot of FIG. 7.
Figure 9:
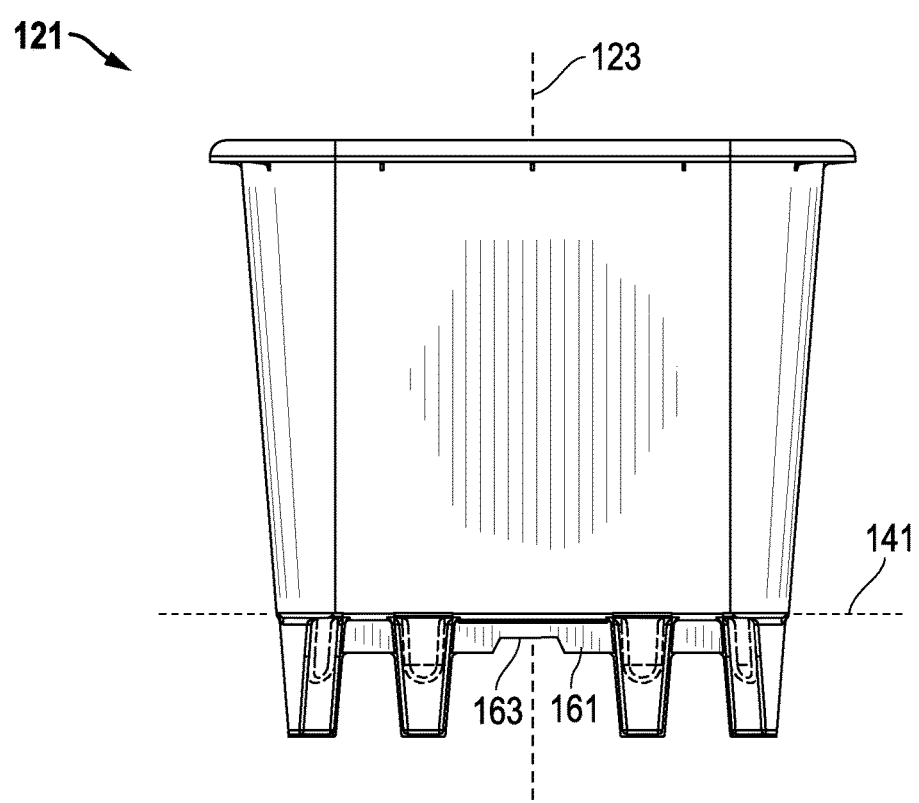
FIG. 9 is a side view of the pot of FIG. 7.
Figure 10:
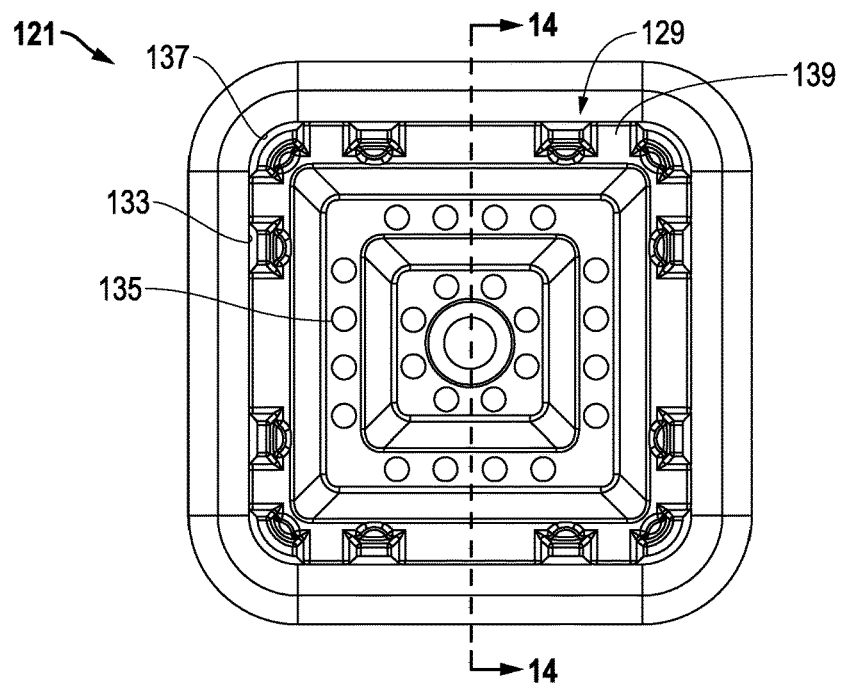
FIG. 10 is a top view of the pot of FIG. 7.
Figure 11:
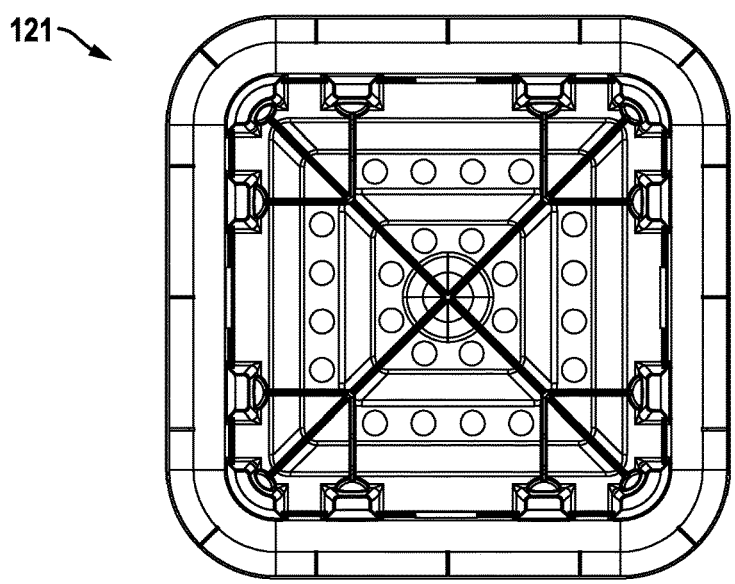
FIG. 11 is a bottom view of the pot of FIG. 7.
Figure 13:
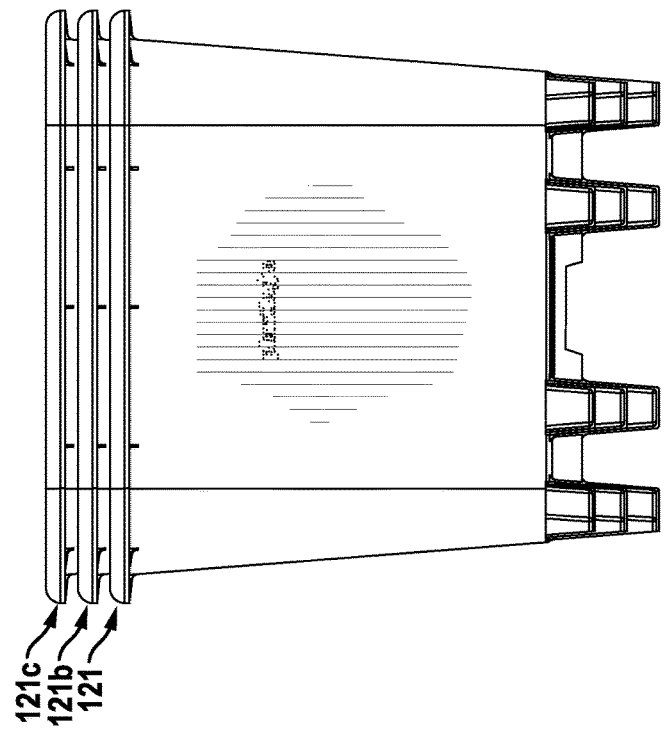
FIG. 13 is a side view of the pots of FIG. 12.
Figure 12:
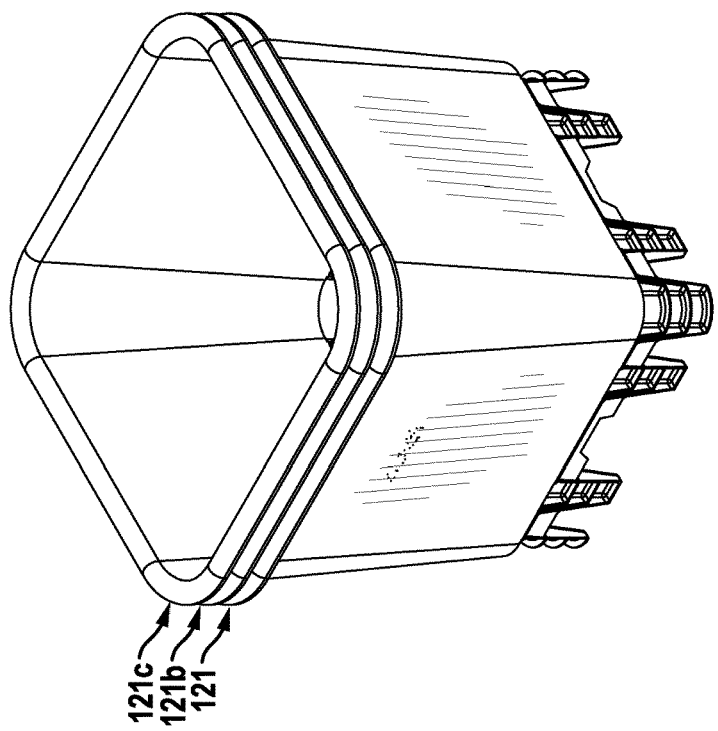
FIG. 12 is a top isometric view of three of the pots of FIG. 7 stacked together.

Embodiments of at least some of the legs 32 have opposing side surfaces 51, 53 (FIGS. 1 and 4). The opposing side surfaces 51, 53 of the legs 32b (FIGS. 5 and 6) of the second container 21b may be configured to be visible from the exterior 31 of the first container 21. Versions of the legs 32 can have opposing end surfaces 55, 57 (FIG. 1). The opposing end surfaces 55, 57 of the legs 32b of the second container 21b may be configured to be visible from the exterior 31 of the first container 21. In an example, the opposing side surfaces 51, 53 may be substantially perpendicular to the opposing end surfaces 55, 57.

Referring now to FIGS. 7-13, other embodiments of a container 121 may include substantially rectangular shapes. The various embodiments depicted herein may utilize any of the features or elements described for the other embodiments. For example, a round container may be tiered as described herein. For ease of reference, the reference numerals of the rectangular embodiments essentially track the reference numerals of the round embodiments, other than using a third digit (i.e., being in the 100's, rather than just two digits).

Figure 14:
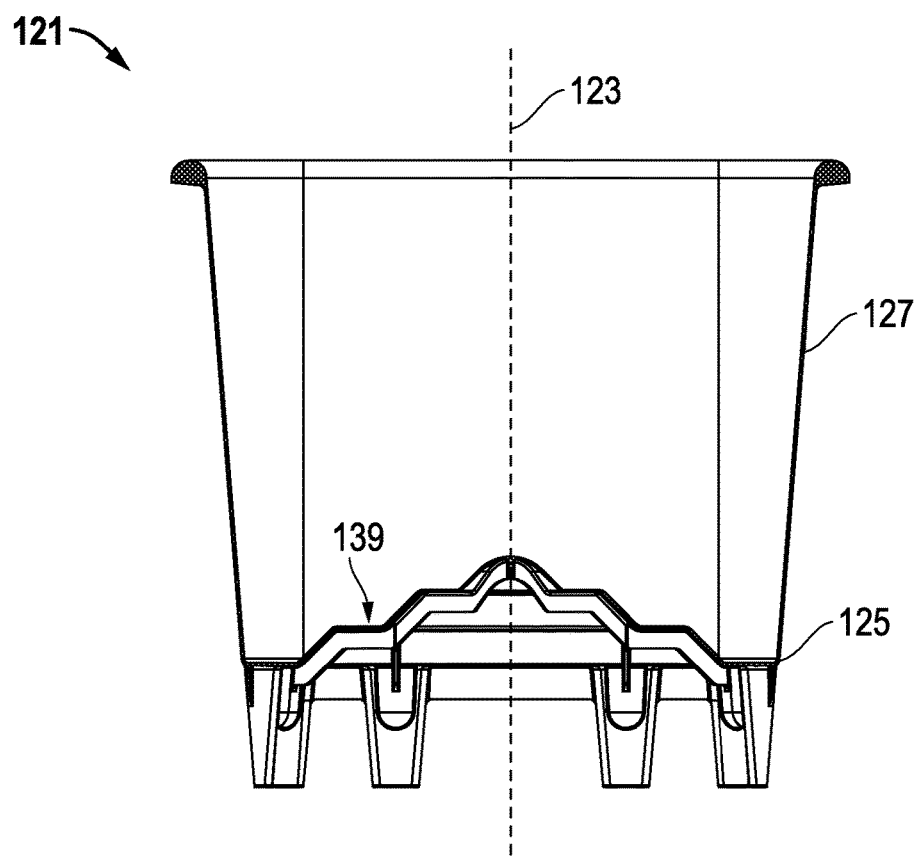
FIG. 14 is a sectional side view of the pot of FIG. 7, taken along the line 14-14 of FIG. 10.

For example, container 121 can have at least one type of drain hole, and is illustrated with three types of drain holes 133, 135, 137. In some versions, at least some of the drain holes 133, 135, 137 may be located at at least two different vertical elevations with respect to the axis 123. In other versions, the drain holes 133, 135, 137 may be located at at least three different elevations. In the illustrated embodiments, the interior bottom 139 is not completely flat. For example, the interior bottom 139 may be tapered, tiered, terraced, pyramidal, conical or still other shapes. In one example (FIG. 14), a highest elevation of the interior bottom 139 may be at the axis 123. In another example, a lowest elevation of the interior bottom 139 may be adjacent the sidewall 127.

Embodiments of the first type of drain hole 133 may include substantially rectangular drain holes. Versions of the first type of drain hole 133 may be located in at least one of the base 125 and the sidewall 127. The first type of drain hole 133 may be located adjacent a perimeter of the base 125. A version of the sidewall 127 may include sidewalls 127 that are flat, and the first type of drain hole 133 may be located along the flat sidewalls 127. In another version, the first type of drain hole 133 may include an inner portion 134 (FIG. 8) that is fluted.

In some embodiments, the second type of drain hole 135 may include circular drain holes. The second type of drain hole 135 an be located in the base 125. A version of the second type of drain hole 135 may include a plurality of holes, which may be configured in square arrays, as shown. In an example, the square arrays may be concentric. In another example, the square arrays may be located at different vertical elevations with respect to the axis 123.

Embodiments of the third type of drain hole 137 may include corner drain holes. Versions of the third type of drain hole 137 may include a rounded outer portion 138 (FIG. 8) and straight side edges 140. In addition, the third type of drain hole 137 may include an inner portion 142 that is fluted.

In other embodiments, at least some of the drain holes 133, 135, 137 align and coincide with the legs 132. For example, the legs 132 may extend from said at least some of the drain holes 133, 137. In some versions, the legs 132 may be complementary in shape to said at least some of the drain holes 133, 137.

Embodiments of the container 121 may further include side wall extensions 161 between the legs 132. The side wall extensions 161 may extend vertically downward with respect to the axis 123 between the legs 132. In one version, the side wall extensions 161 comprise notches 163 between the legs 132.

Figure 15:
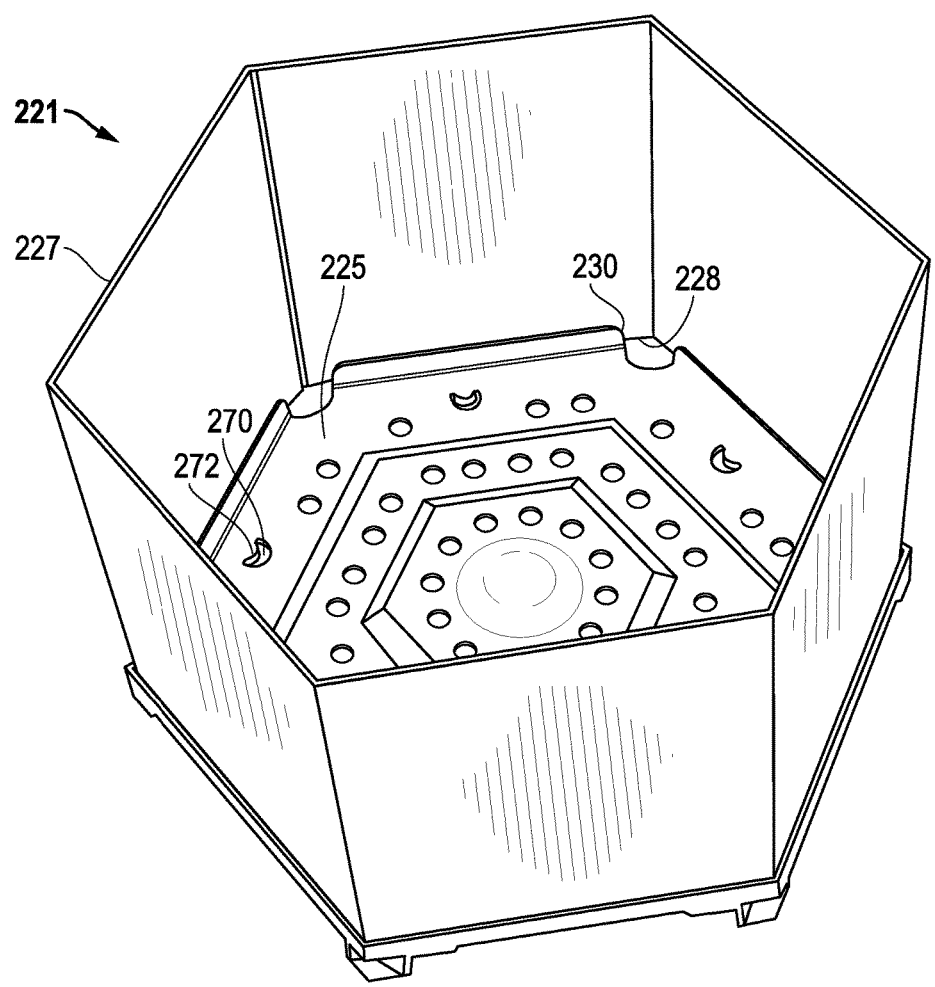
FIG. 15 is a top isometric view of another embodiment of a pot.

Referring now to FIG. 15, another embodiment of a container 221 may include at least two separate components. As stated herein, the various embodiments depicted may utilize any of the features or elements described for the other embodiments. For ease of reference, the reference numerals of the present embodiment essentially track the reference numerals of the other embodiments, other than being in the 200's.

For example, the base 225 may be removably coupled to the sidewall 227. In some versions, the base 225 and the sidewall 227 may include two separate components that are configured to be assembled together. In one example, the base 225 and the sidewall 227 may be formed from two different materials. A version of the base 225 may be thicker than the sidewall 227, or vice versa. Embodiments may include a lower edge 228 of the sidewall 227 to seat in an upper groove 230 in the base 225 to mount the sidewall 227 to the base 225. In one version, the sidewall 227 may include flaps 270 that couple features 272 in the base 225. For example, the flaps 270 may include holes that engage tabs on the base 225 to secure the sidewall 227 to the base 225.

Referring now to FIGS. 16-19, other embodiments of a container 321 may include a round shape with a tiered bottom. These embodiments may utilize any of the features or elements described for the other embodiments. For ease of reference, the reference numerals of the rectangular embodiments essentially track the reference numerals of the round embodiments, other than being in the 300s.

Figure 18:
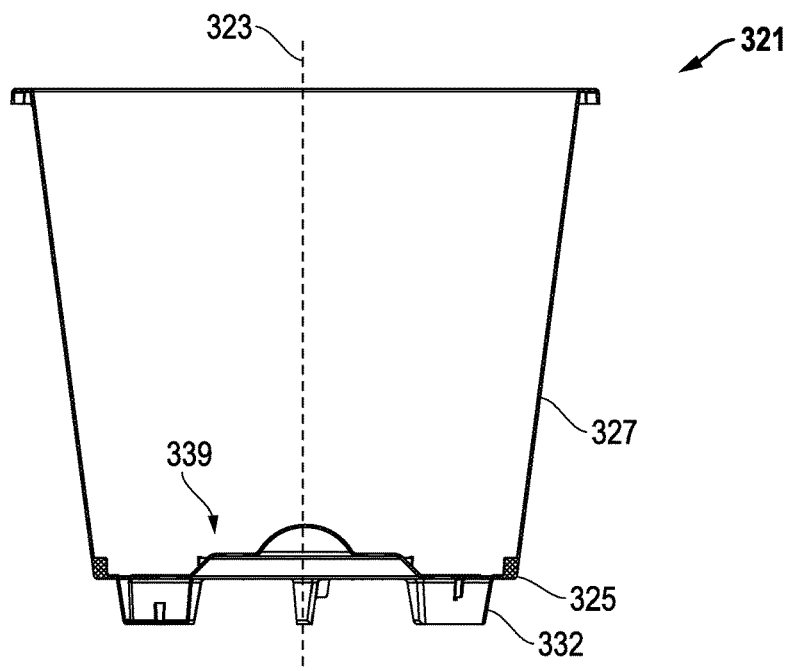
FIG. 18 is a sectional side view of the pot of FIG. 16, taken along the line 18-18 of FIG. 17.

For example, container 321 can have at least one type of drain hole, and is illustrated with two types of drain holes 335, 337. In some versions, at least some of the drain holes 335, 337 may be located at at least two different vertical elevations with respect to the axis 323 (FIG. 18). In the illustrated embodiments, the interior bottom 339 is not completely flat. For example, the interior bottom 339 may be tapered, tiered, terraced, pyramidal, conical or still other shapes. In one example, a highest elevation of the interior bottom 339 may be at the axis 323. In another example, a lowest elevation of the interior bottom 339 may be adjacent the sidewall 327.

Embodiments of the first type of drain hole 335 may include circular drain holes. The first type of drain hole 335 an be located in the base 325. A version of the first type of drain hole 335 may include a plurality of holes, which may be configured in circular arrays, as shown. In an example, the circular arrays may be concentric. In another example, the circular arrays may be located at different vertical elevations with respect to the axis 323.

Embodiments of the second type of drain hole 337 may include slotted drain holes. Versions of the second type of drain hole 337 may include elongated rectangles configured in a radial array from a central portion of the base 325 to the side wall 327. In addition, the second type of drain hole 337 may coincide and align with tops of legs 332. For example, the legs 332 may extend from the second type of drain holes 337, and the legs 332 may be complementary in shape to the second type of drain holes 337.

Figure 16:
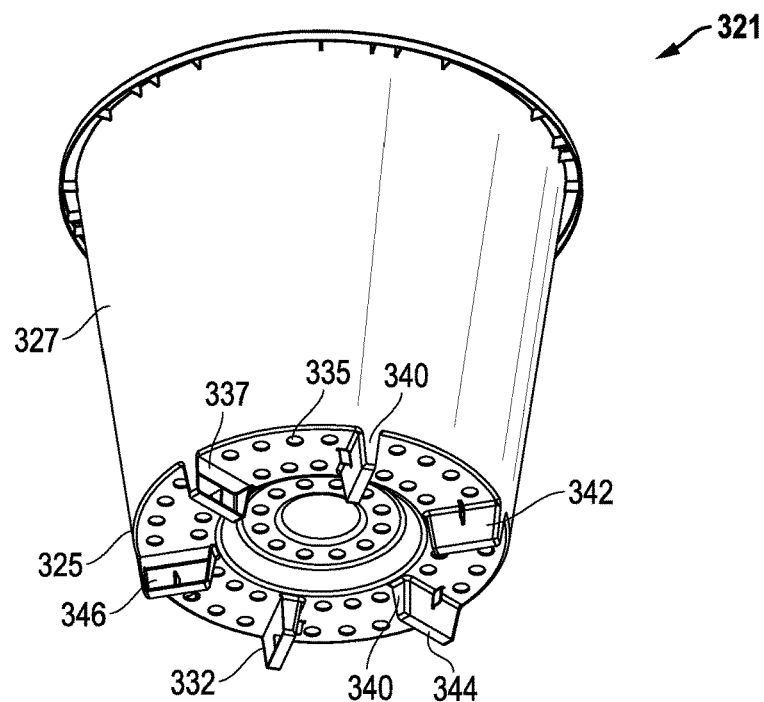
FIG. 16 is a bottom isometric view of an alternate embodiment of a pot.
Figure 17:
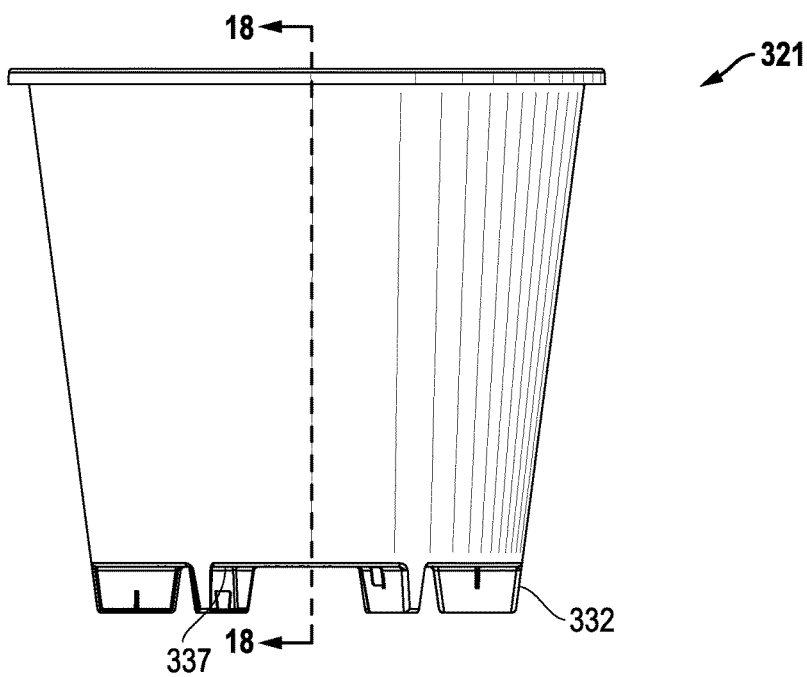
FIG. 17 is a side view of the pot of FIG. 16.
Figure 19:
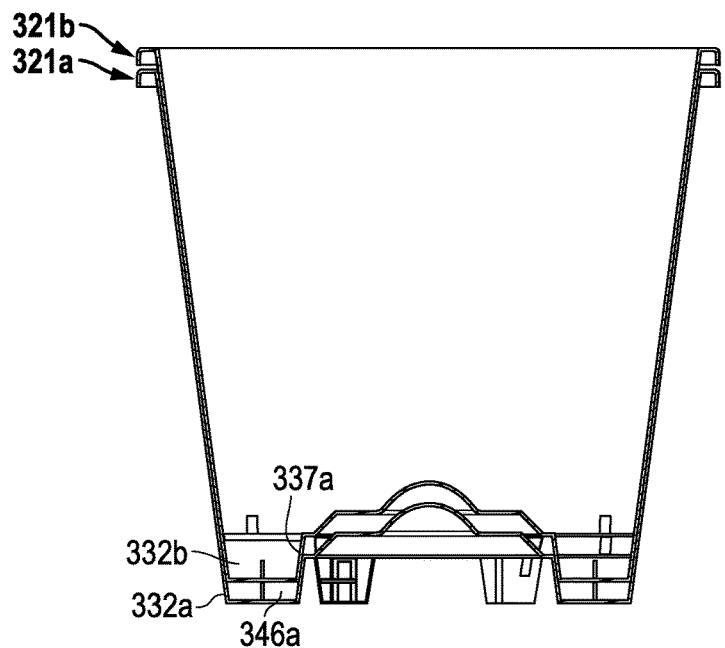
FIG. 19 is a sectional side view of two of the pots of FIG. 16, stacked one inside the other.

Versions of legs 332 may further include an open structure. For example, as shown in FIG. 16, each leg 332 may include side walls 340, a back wall 342, a foot 344 and an aperture or open face 346 opposite the back wall 342. As shown in FIG. 19, such designs facilitate and enable a first container 321a to receive and be stacked with a second container 321b. For example, legs 332b may extend through the second type of drain holes 337a, such that the side walls 340b, inner surfaces of back walls 342 and feet 344 of legs 332b are visible through open faces 346a of container 321a.

Embodiments may include a square-containing body of four sidewalls with rounded edges. The square body has an open top extreme surrounded by an outer rounded border that is an extension of the containing body, jutting outwards forming such border. In the lower part of the containing body there is a base with a staggered pyramid-like structure of four sides. This structure includes at least three echelons. The first echelon is located adjacent to the edge formed by the lower periphery of the containing body; the second and third echelons are disposed to form a four sided staggered pyramidal structure inside the containing body. At each side of the first echelon and on the surface parallel to the base, are situated at least two equidistant round holes, preferably four holes on this first echelon. At each side of the second echelon and on the surface parallel to the base, there is located at least one round hole, preferably two holes.

At the outer lower part of the base and on each one of the vertices forming the sidewalls of the containing body, there is at least one supporting means, such supporting means has an elongated structure measuring at least 1 cm height. The elongated structure is an extension of the rounded edge of the containing body, preferably three supporting means per vertex. These supporting means are situated parallel to the vertex of the containing body and are equidistant to each other.

Such a structure is suitable for growing blueberries and raspberries in substrate since it prevents the contact between the plant roots and the soil due to the supporting means at the base, preventing exposing the plant to pathogenic agents, also improving drainage and root health. The pot's staggered base reduces the wet zone also, while its shape allows compact packing thus minimizing shipping costs.

Other versions may include a cylindrical body with a top diameter bigger than the diameter at the base. These diameter proportions favor pot transportation allowing stacking multiple pots one on top of another. The upper part of the cylindrical body displays a peripheral border. The base has multiple long slits radially disposed on its outer side. There are preferably 6 long equidistant slits. In the same way, multiple elongated supports can be found at the base, radially and equidistantly located between the slits from 2 to 3 cm height, preferably 6 in number of 3 cm height. The slits and the supporting means are configured in such a way as to allow a free circular area at the center of the base. The free circular area is devoid of slits and supports to provide a more solid structure to the base.

Between a given slit and a support at least one circular hole is located of up to 0.5 cm in diameter. Between each slit and each supporting means there are preferably two holes. These holes allow better drainage of the wastes coming from the substrate growing carried out within the pot's body.

In some versions, at the lower outer periphery of the pot's cylindrical body and adjacent to the base square slots are located of up to about 1 cm$^2$. These square slots are distributed following the same line of holes at the base between each slit and each support.

The embodiments described herein may offer substantial technical advantages over prior art container designs. Such designs permit air flow between the base and the ground, thus providing improved conditions for efficient crop production. The base has multiple supporting elements that prevent contact between the plant roots and the ground, thus avoiding exposure to pathogenic agents. The base also has multiple holes to permit efficient drainage of fluids resulting from plant growing.

Embodiments also may comprise one or more of the following items.

Item 1. A pot for a plant, comprising:

a container having an axis that is vertical, a base, a sidewall extending upward from the base, an interior, an exterior, drain holes extending from the interior to the exterior, an interior bottom, a plane defined in the interior and legs extending downward from the base; and the container is configured to receive and be stacked with a second container inside of the container, the second container is substantially identical to the container, such that the legs of the second container are configured to extend through the drain holes of the container beyond the interior bottom of the container, such that the legs of the second container are visible from the exterior of the first container.

Item 2. The pot of item 1, wherein the interior bottom is an axially lowermost portion of the interior of the container, and the legs of the second container are configured to extend axially below the interior bottom.

Item 3. The pot of item 1, wherein the legs of the second container are configured to extend below a lowermost portion of the exterior of the base.

Item 4. The pot of item 1, wherein the plane is an axially lowermost plane in the interior of the container.

Item 5. The pot of item 1, wherein the container has a profile shape that is cylindrical, frustoconical, hexagonal polygonal, rectangular or square.

Item 6. The pot of item 1, wherein a percentage of an axial length of the legs of the second container are visible from the exterior of the first container, and the percentage is at least about 10%, at least about 20%, at least about 30%, at least about 40%, at least about 50%, at least about 60%.

Item 7. The pot of item 1, wherein the plane is substantially perpendicular to the axis.

Item 8. The pot of item 1, wherein the drain holes comprise at least two different types of drain holes.

Item 9. The pot of item 8, wherein a first type of drain hole comprises substantially rectangular drain holes.

Item 10. The pot of item 8, wherein a first type of drain hole is located in at least one of the sidewall and the base.

Item 11. The pot of item 10, wherein the first type of drain hole is located adjacent a perimeter of the base.

Item 12. The pot of item 8, wherein a second type of drain hole comprises circular drain holes.

Item 13. The pot of item 8, wherein a second type of drain hole is located in the base.

Item 14. The pot of item 13, wherein the second type of drain hole comprises a plurality of holes configured in a radial array.

Item 15. The pot of item 14, wherein the radial array extends from adjacent the axis to adjacent a perimeter of the base.

Item 16. The pot of item 8, wherein a third type of drain hole comprises elongated slot drain holes.

Item 17. The pot of item 8, wherein a third type of drain hole is located in the base.

Item 18. The pot of item 17, wherein the third type of drain hole comprises a plurality of holes configured in a radial array.

Item 19. The pot of item 18, wherein the radial array extends from adjacent the axis to adjacent a perimeter of the base.

Item 20. The pot of item 1, wherein the legs comprise substantially flat fins.

Item 21. The pot of item 20, wherein the flat fins are rectangular.

Item 22. The pot of item 1, wherein the legs are formed in a radial array.

Item 23. The pot of item 22, wherein the radial array extends from adjacent the axis to adjacent a perimeter of the base.

Item 24. The pot of item 1, wherein the legs are substantially perpendicular to the base.

Item 25. The pot of item 1, wherein the legs are substantially perpendicular to a tangent of the sidewall.

Item 26. The pot of item 1, wherein at least some of the legs have opposing side surfaces, and the opposing side surfaces of the legs of the second container are configured to be visible from the exterior of the first container.

Item 27. The pot of item 26, wherein the legs have opposing end surfaces, and the opposing end surfaces of the legs of the second container are configured to be visible from the exterior of the first container.

Item 28. The pot of item 27, wherein the opposing side surfaces are substantially perpendicular to the opposing end surfaces.

Item 29. The pot of item 1, wherein at least some of the drain holes are located at at least two different vertical elevations with respect to the axis.

Item 30. The pot of item 1, wherein the drain holes are located at at least three different elevations.

Item 31. The pot of item 1, wherein the interior bottom is not flat.

Item 32. The pot of item 31, wherein the interior bottom is tapered, terraced, pyramidal or conical.

Item 33. The pot of item 1, wherein a highest elevation of the interior bottom is at the axis, and a lowest elevation of the interior bottom is adjacent the sidewall.

Item 34. The pot of item 1, wherein the drain holes comprise at least two different types of drain holes.

Item 35. The pot of item 34, wherein a first type of drain hole comprises substantially rectangular drain holes.

Item 36. The pot of item 34, wherein a first type of drain hole is located in at least one of the sidewall and the base.

Item 37. The pot of item 36, wherein the first type of drain hole is located adjacent a perimeter of the base.

Item 38. The pot of item 36, wherein the sidewall comprises sidewalls that are flat, and the first type of drain hole is located along the flat sidewalls.

Item 39. The pot of item 36, wherein the first type of drain hole comprises an inner portion that is fluted.

Item 40. The pot of item 34, wherein a second type of drain hole comprises circular drain holes.

Item 41. The pot of item 34, wherein a second type of drain hole is located in the base.

Item 42. The pot of item 41, wherein the second type of drain hole comprises a plurality of holes configured in square arrays.

Item 43. The pot of item 42, wherein the square arrays are concentric, and located at different vertical elevations with respect to the axis.

Item 44. The pot of item 34, wherein a third type of drain hole comprises corner drain holes.

Item 45. The pot of item 44, wherein the third type of drain hole has a rounded outer portion and straight side edges.

Item 46. The pot of item 45, wherein the third type of drain hole comprises an inner portion that is fluted.

Item 47. The pot of item 34, wherein at least some of the drain holes align and coincide with the legs, such that the legs extend from said at least some of the drain holes.

Item 48. The pot of item 47, wherein the legs are complementary in shape to said at least some of the drain holes.

Item 49. The pot of item 1, further comprising side wall extensions between the legs, the side wall extensions extend vertically downward with respect to the axis between the legs.

Item 50. The pot of item 49, wherein the side wall extensions comprise notches between the legs.

Item 51. The pot of item 1, wherein the container is opaque, not translucent and not transparent.

Item 52. The pot of item 1, wherein, when stacked, an axial distance of separation between the container and the second container is configured to be not greater than about 25 mm, not greater than about 20 mm, not greater than about 15 mm, not greater than about 10 mm, not greater than about 5 mm.

Item 53. The pot of item 1, wherein bottoms of the legs of the second container are configured to be axially spaced apart from bottoms of the legs of the container by not greater than about 25 mm, not greater than about 20 mm, not greater than about 15 mm, not greater than about 10 mm, not greater than about 5 mm.

Item 54. The pot of item 1, wherein the pot is configured to be used without a tray to capture or retain fluid in the pot during operation, such that the drain holes remain uncovered and unhindered during operation at all times.

Item 55. The pot of item 1, wherein the base is removably coupled to the sidewall such that the base and the sidewall comprise two separate components that are configured to be assembled together.

Item 56. The pot of item 55, wherein the base and the sidewall are formed from two different materials.

Item 57. The pot of item 55, wherein the base is thicker than the sidewall.

Item 58. The pot of item 55, wherein a lower edge of the sidewall seats in an upper groove in the base to mount the sidewall to the base.

Item 59. The pot of item 55, wherein the sidewall comprises flaps that insert through apertures in the base, and the flaps comprise holes that engage tabs on the base to secure the sidewall to the base.

Item 60. A stack of containers, comprising:
a first container having an axis that is vertical, a base, a sidewall extending axially upward from the base, an interior, an exterior, drain holes extending from the interior to the exterior, an interior bottom, a rim at an upper portion and legs at a lower portion; and
a second container, substantially identical to the first container, stacked inside of the first container, such that both the rim and the legs of the second container are visible from the exterior of the first container.

Item 62. A pot for a plant, comprising:
a container that is round and has an axis that is vertical, a base, a sidewall extending upward from the base, an interior, an exterior, at least two different types of drain holes extending from the interior to the exterior, an interior bottom, and legs extending downward from the base;
a first type of drain hole is located adjacent a perimeter of the base in at least one of the sidewall and the base;
a second type of drain hole is located in the base and comprises a plurality of holes configured in a radial array; and
the legs comprise substantially flat fins that are configured in a radial array.

Item 63. A pot for a plant, comprising:
a container that is rectangular and has an axis that is central and vertical, a base, sidewalls extending upward from the base, an interior, an exterior, at least two different types of drain holes extending from the interior to the exterior, an interior bottom that is not flat, and legs extending downward from the base;
a first type of drain hole is formed in at least one of the sidewall and the base, and located adjacent a perimeter of the base; and
a second type of drain holes located in the base and at a different vertical elevation that the first type of drain holes.

Item 64. A pot for a plant, comprising:
a container having an axis that is vertical, a base, a sidewall extending upward from the base, an interior, an exterior, drain holes extending from the interior to the exterior, an interior bottom, and legs extending downward from the base; and
the base is removably coupled to the sidewall such that the base and the sidewall comprise two separate components that are configured to be assembled together.

This written description uses examples to disclose the embodiments, including the best mode, and also to enable those of ordinary skill in the art to make and use the invention. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A pot for a plant, comprising:
a container having an axis that is vertical, a base, a sidewall extending upward from the base, an interior, an exterior, drain holes comprising unobstructed apertures extending from the interior to the exterior, the drain holes are at at least three different vertical elevations, an interior bottom, a plane defined in the interior, legs extending downward directly from the base, and a horizontal foot, formed of a continuous wall, at a bottom of each of the legs, wherein some of the drain holes comprise leg drain holes at tops of the legs, the leg drain holes define perimeters of respective ones of the legs, each of the legs comprises a leg wall extending down from a respective one of the leg drain holes and an exposed portion without a leg wall, such that the exposed portion is unobstructed and comprises an open window to the interior of the container through the leg drain hole, and the leg drain holes are complementary in shape to respective ones of the horizontal feet; and
the container is configured to receive and be stacked with a second container inside of the container, the second container is substantially identical to the container, wherein legs of the second container are configured to align with the legs of the container and extend beyond the plane of the container through and below the leg drain holes in the container, such that the legs of the second container are visible from the exterior of the container, adjacent respective ones of the legs of the container and below the leg drain holes through the open windows.

2. The pot of claim 1, wherein the interior bottom is an axially lowermost portion of the interior of the container, the legs of the second container are configured to extend axially below the interior bottom, and each of the legs of the container comprises a plurality of the leg walls that extend down from a respective one of the leg drain holes to a respective one of the horizontal feet.

3. The pot of claim 1, wherein the legs of the second container are configured to extend below a lowermost portion of an exterior of the sidewall, and each horizontal foot is substantially vertically aligned with a respective leg drain hole.

4. The pot of claim 1, wherein the plane is not an axially lowermost plane in the interior of the container.

5. The pot of claim 1, wherein the container has a profile shape that is cylindrical, frustoconical, hexagonal, polygonal, rectangular or square.

6. The pot of claim 1, wherein a percentage of an axial length of the legs of the second container are visible from the exterior of the first container, and the percentage is at least about 10%.

7. The pot of claim 1, wherein the drain holes comprise:
 a first type of drain hole comprising at least some of the leg drain holes as substantially rectangular drain holes;
 a second type of drain hole comprising circular drain holes; and
 a third type of drain hole also comprising circular drain holes that are at a different vertical elevation than the second type of drain holes.

8. The pot of claim 1, wherein at least some of the legs have side surfaces, and the side surfaces of the legs of the second container are configured to be visible from the exterior of the first container.

9. The pot of claim 8, wherein the legs have end surfaces, and the end surfaces of the legs of the second container are configured to be visible from the exterior of the first container.

10. The pot of claim 1, wherein the interior bottom is tapered, terraced, pyramidal or conical.

11. The pot of claim 1, wherein a highest elevation of the interior bottom is at the axis, and a lowest elevation of the interior bottom is adjacent the sidewall.

12. The pot of claim 1, wherein, when stacked, an axial distance of separation between the container and the second container is configured to be not greater than about 25 mm.

* * * * *